(12) United States Patent
Kim et al.

(10) Patent No.: US 11,362,332 B2
(45) Date of Patent: Jun. 14, 2022

(54) POSITIVE ELECTRODE ACTIVE MATERIAL FOR LITHIUM SECONDARY BATTERY, METHOD OF PREPARING THE SAME, AND POSITIVE ELECTRODE FOR LITHIUM SECONDARY BATTERY AND LITHIUM SECONDARY BATTERY WHICH INCLUDE THE POSITIVE ELECTRODE ACTIVE MATERIAL

(71) Applicant: LG Chem, Ltd., Seoul (KR)

(72) Inventors: Won Tae Kim, Daejeon (KR); Sun Sik Shin, Daejeon (KR); Yeo June Yoon, Daejeon (KR); Hong Kyu Park, Daejeon (KR); Seong Hoon Kang, Daejeon (KR); Jong Yeol Yu, Daejeon (KR)

(73) Assignee: LG Chem, Ltd.

( * ) Notice: Subject to any disclaimer, the term of this patent is extended or adjusted under 35 U.S.C. 154(b) by 200 days.

(21) Appl. No.: 16/630,720

(22) PCT Filed: Oct. 11, 2018

(86) PCT No.: PCT/KR2018/011984
§ 371 (c)(1),
(2) Date: Jan. 13, 2020

(87) PCT Pub. No.: WO2019/074305
PCT Pub. Date: Apr. 18, 2019

(65) Prior Publication Data
US 2021/0036318 A1    Feb. 4, 2021

(30) Foreign Application Priority Data
Oct. 12, 2017  (KR) .................. 10-2017-0132681
Oct. 10, 2018  (KR) .................. 10-2018-0120667

(51) Int. Cl.
*H01M 4/525*  (2010.01)
*C01G 51/00*  (2006.01)
(Continued)

(52) U.S. Cl.
CPC .......... *H01M 4/525* (2013.01); *C01G 51/006* (2013.01); *H01M 4/366* (2013.01); *H01M 10/0525* (2013.01); *H01M 2004/028* (2013.01)

(58) Field of Classification Search
None
See application file for complete search history.

(56) References Cited

U.S. PATENT DOCUMENTS

2003/0054250 A1   3/2003   Kweon et al.
2003/0211391 A1   11/2003  Cho et al.
(Continued)

FOREIGN PATENT DOCUMENTS

| CA | 2388936 A1 | 12/2002 |
|---|---|---|
| CN | 104781960 A | 7/2015 |

(Continued)

OTHER PUBLICATIONS

Machine translation of KR20110063335 (Year: 2011).*
(Continued)

*Primary Examiner* — Wyatt P McConnell
(74) *Attorney, Agent, or Firm* — Lerner, David, Littenberg, Krumholz & Mentlik, LLP

(57) ABSTRACT

A method of preparing a positive electrode active material includes mixing a lithium raw material and a nickel-containing transition metal hydroxide precursor containing nickel in an amount of 65 mol % or more based on a total number of moles of transition metals and performing a first heat treatment to prepare a nickel-containing lithium transition metal oxide. The method also includes mixing a boron and carbon-containing raw material and a cobalt-containing (Continued)

raw material with the nickel-containing lithium transition metal oxide to form a mixture, and performing a second heat treatment on the mixture to form a coating material including B and Co on a surface of the lithium transition metal oxide. A positive electrode active material prepared by the preparation method is formed, and a positive electrode for a lithium secondary battery and a lithium secondary battery which include the positive electrode active material.

14 Claims, 7 Drawing Sheets

(51) Int. Cl.
  *H01M 4/36* (2006.01)
  *H01M 10/0525* (2010.01)
  *H01M 4/02* (2006.01)

(56) References Cited

U.S. PATENT DOCUMENTS

| | | |
|---|---|---|
| 2015/0171424 A1 | 6/2015 | Kawai |
| 2016/0013476 A1* | 1/2016 | Oh .................. H01M 4/131 |
| | | 429/223 |
| 2018/0241073 A1 | 8/2018 | You et al. |
| 2018/0351169 A1 | 12/2018 | Oh et al. |

FOREIGN PATENT DOCUMENTS

| | | |
|---|---|---|
| CN | 105244492 A | 1/2016 |
| CN | 105845891 A | 8/2016 |
| CN | 106532006 A | 3/2017 |
| JP | H08138670 A | 5/1996 |
| JP | 3723444 B2 | 12/2005 |
| JP | 2012221855 A | 11/2012 |
| JP | 2015133318 A | 7/2015 |
| JP | 2015536558 A | 12/2015 |
| JP | 2016051503 A | 4/2016 |
| JP | 2016216340 A | 12/2016 |
| KR | 20030088246 A | 11/2003 |
| KR | 100542184 B1 | 1/2006 |
| KR | 20110063335 A | 6/2011 |
| KR | 20150049288 A | 5/2015 |
| KR | 20150050458 A | 5/2015 |
| KR | 20170046066 A | 4/2017 |
| KR | 20170063383 A | 6/2017 |
| KR | 20170076088 A | 7/2017 |
| WO | 2015186321 A1 | 12/2015 |

OTHER PUBLICATIONS

International Search Report from Application No. PCT/KR2018/011984 dated Mar. 13, 2019, 2 pages.
Search Report for Chinese Application No. 201880047150.4 dated Sep. 17, 2021. 3 pgs.

* cited by examiner

POSITIVE ELECTRODE ACTIVE MATERIAL FOR LITHIUM SECONDARY BATTERY, METHOD OF PREPARING THE SAME, AND POSITIVE ELECTRODE FOR LITHIUM SECONDARY BATTERY AND LITHIUM SECONDARY BATTERY WHICH INCLUDE THE POSITIVE ELECTRODE ACTIVE MATERIAL

CROSS-REFERENCE TO RELATED APPLICATIONS

The present application is a national stage entry under 35 U.S.C. § 371 of International Application No. PCT/KR2018/011984 filed on Oct. 11, 2018, which claims priority to Korean Patent Application Nos. 10-2017-0132681, filed on Oct. 12, 2017, and 10-2018-0120667, filed on Oct. 10, 2018, in the Korean Intellectual Property Office, the disclosures of which are incorporated herein in their entirety by reference.

TECHNICAL FIELD

The present invention relates to a positive electrode active material for a lithium secondary battery, a method of preparing the positive electrode active material, and a positive electrode for a lithium secondary battery and a lithium secondary battery which include the positive electrode active material.

BACKGROUND ART

Demand for secondary batteries as an energy source has been significantly increased as technology development and demand with respect to mobile devices have increased.

Among these secondary batteries, lithium secondary batteries having high energy density, high voltage, long cycle life, and low self-discharging rate have been commercialized and widely used.

Lithium transition metal composite oxides have been used as a positive electrode active material of the lithium secondary battery, and, among these oxides, a lithium cobalt composite metal oxide, such as $LiCoO_2$, having a high operating voltage and excellent capacity characteristics has been mainly used. However, the $LiCoO_2$ has very poor thermal properties due to an unstable crystal structure caused by delithiation. Also, since the $LiCoO_2$ is expensive, there is a limitation in using a large amount of the $LiCoO_2$ as a power source for applications such as electric vehicles.

Lithium manganese composite metal oxides ($LiMnO_2$ or $LiMn_2O_4$), lithium iron phosphate compounds ($LiFePO_4$, etc.), or lithium nickel composite metal oxides ($LiNiO_2$, etc.) have been developed as materials for replacing the $LiCoO_2$. Among these materials, research and development of the lithium nickel composite metal oxides, in which a large capacity battery may be easily achieved due to a high reversible capacity of about 200 mAh/g, have been more actively conducted. However, the $LiNiO_2$ has limitations in that the $LiNiO_2$ has poorer thermal stability than the $LiCoO_2$ and, when an internal short circuit occurs in a charged state due to an external pressure, the positive electrode active material itself is decomposed to cause rupture and ignition of the battery. Accordingly, as a method to improve low thermal stability while maintaining the excellent reversible capacity of the $LiNiO_2$, a lithium nickel cobalt metal oxide, in which a portion of nickel (Ni) is substituted with cobalt (Co), manganese (Mn), or aluminum (Al), has been developed.

However, with respect to the lithium nickel cobalt metal oxide, structural stability and capacity are low, the nickel is oxidized from $Ni^{2+}$ to $Ni^{3+}$ or $Ni^{4+}$ as charge and discharge proceed particularly when the amount of nickel is increased to increase capacity characteristics, and, accordingly, since rapid oxygen desorption proceeds, there is a limitation in that the structural stability is further reduced.

Thus, there is a need to develop a positive electrode active material which includes a lithium nickel cobalt metal oxide having a high Ni content that exhibits high capacity characteristics, wherein a high-capacity and long-life battery may be prepared due to excellent structural stability of the lithium nickel cobalt metal oxide.

DISCLOSURE OF THE INVENTION

Technical Problem

An aspect of the present invention provides a method of preparing a positive electrode active material in which high capacity characteristics may be achieved and structural stability may be improved by including a lithium transition metal oxide having a high nickel content, but by coating a surface of the lithium transition metal oxide with a specific raw material.

Another aspect of the present invention provides a positive electrode active material on which a coating material including a specific amount of cobalt (Co) is formed.

Another aspect of the present invention provides a positive electrode for a lithium secondary battery which includes the positive electrode active material.

Another aspect of the present invention provides a lithium secondary battery including the positive electrode for a lithium secondary battery.

TECHNICAL SOLUTION

According to an aspect of the present invention, there is provided a method of preparing a positive electrode active material which includes: performing a first heat treatment on a lithium raw material and a nickel-containing transition metal hydroxide precursor containing nickel in an amount of 65 mol % or more based on a total number of moles of transition metals to prepare a nickel-containing lithium transition metal oxide; mixing a boron (B) and carbon (C)-containing raw material and a cobalt (Co)-containing raw material with the nickel-containing lithium transition metal oxide to form a mixture; and performing a second heat treatment on the mixture to form a coating material including B and Co on a surface of the lithium transition metal oxide.

According to another aspect of the present invention, there is provided a positive electrode active material including a nickel-containing lithium transition metal oxide containing nickel in an amount of 65 mol % or more based on a total number of moles of transition metals excluding lithium; and a coating material distributed on a surface of the nickel-containing lithium transition metal oxide, wherein the coating material includes boron (B) and cobalt (Co), and 1,000 ppm to 5,000 ppm of the Co is included in the coating material.

According to another aspect of the present invention, there is provided a positive electrode for a lithium secondary battery which includes the positive electrode active material according to the present invention.

According to another aspect of the present invention, there is provided a lithium secondary battery including the positive electrode according to the present invention.

Advantageous Effects

According to the present invention, oxygen desorption due to the oxidation of nickel (Ni) may be prevented by forming a coating material including boron (B) and cobalt (Co) on the surface of a lithium transition metal oxide having a high nickel content using a specific raw material. Accordingly, structural stability of a positive electrode active material may be improved by suppressing a side reaction between the positive electrode active material and an electrolyte solution. A secondary battery having improved output characteristics and life characteristics may be provided when the battery is prepared by using the positive electrode active material.

Particularly, since a specific compound is used as the coating raw material, a reduction in resistance characteristics due to the oxidation of Co may be prevented.

MODE FOR CARRYING OUT THE INVENTION

Figure 1:
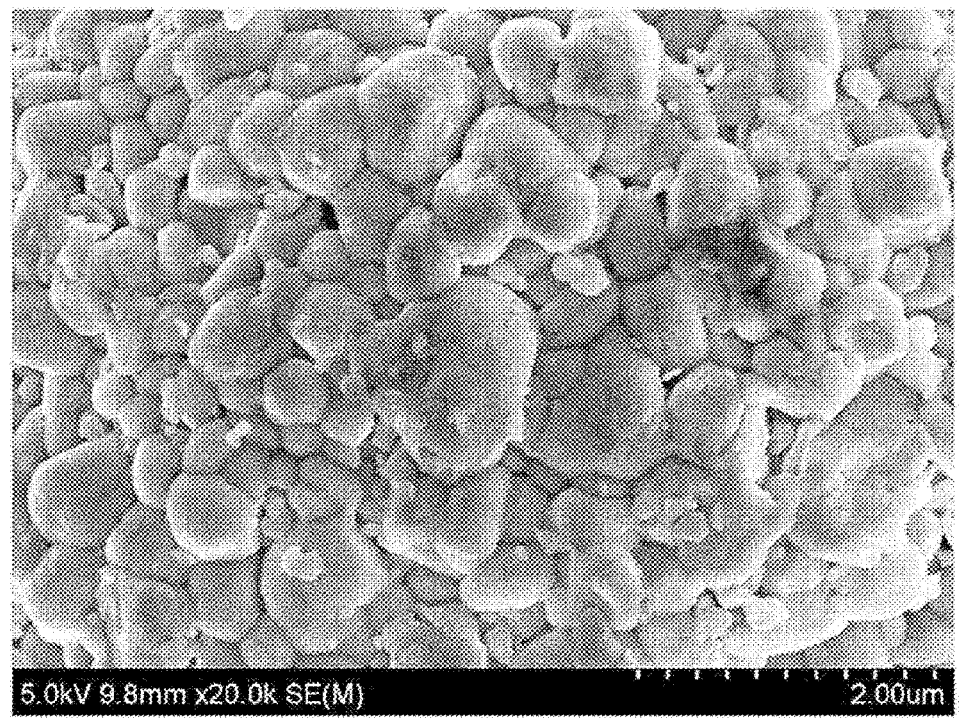
FIG. 1 is a scanning electron microscope image of a positive electrode active material prepared in Example 1.
Figure 2:
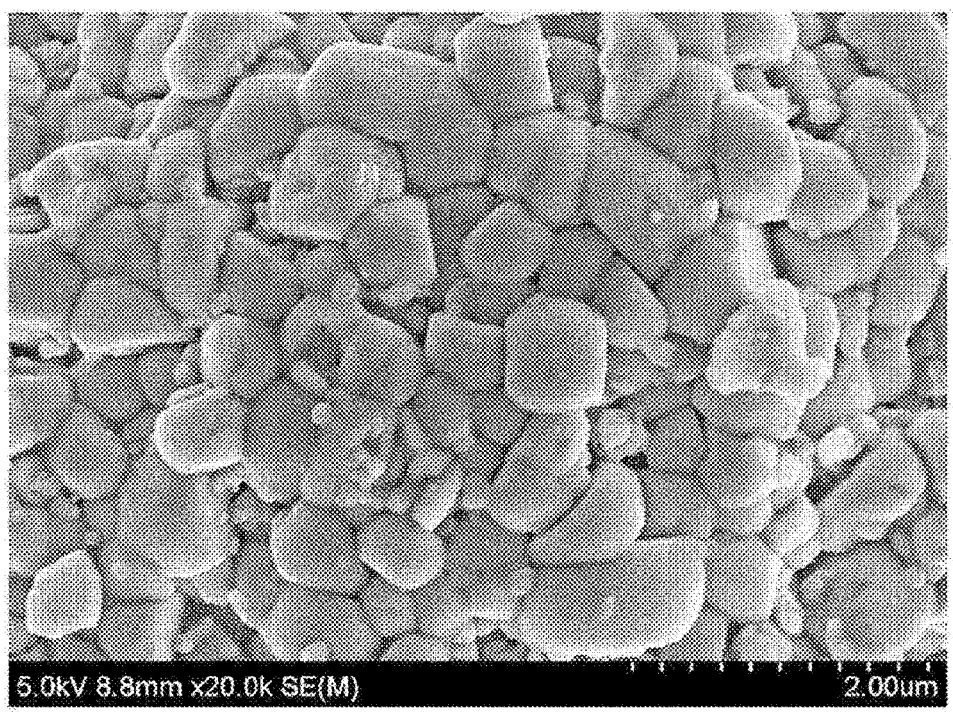
FIG. 2 is a scanning electron microscope image of a positive electrode active material prepared in Comparative Example 1.
Figure 3:
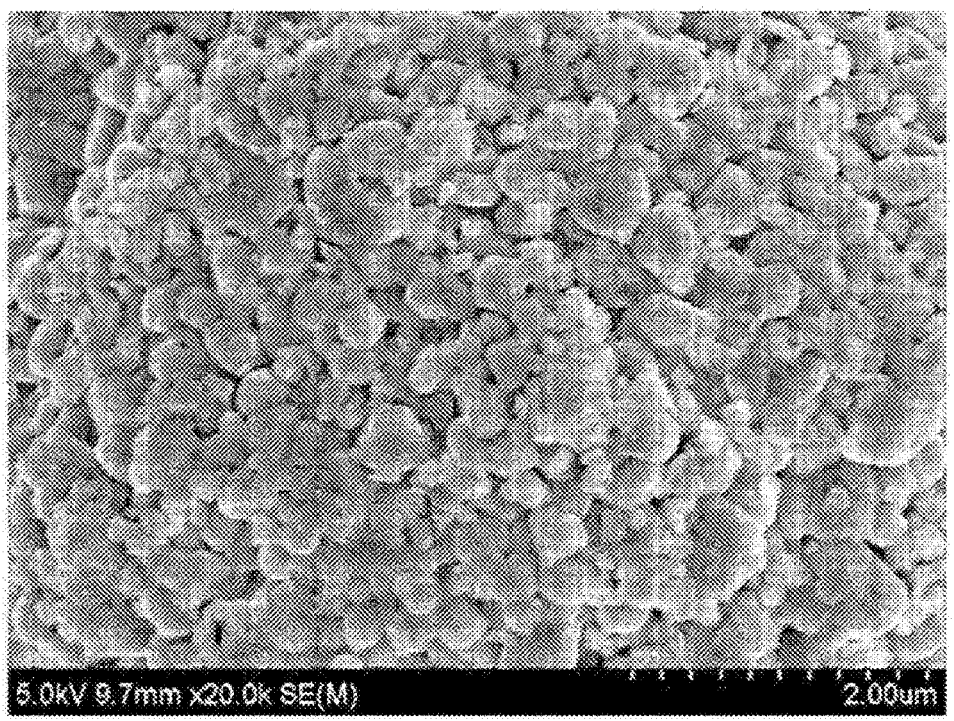
FIG. 3 is a scanning electron microscope image of a positive electrode active material prepared in Comparative Example 2.
Figure 4:
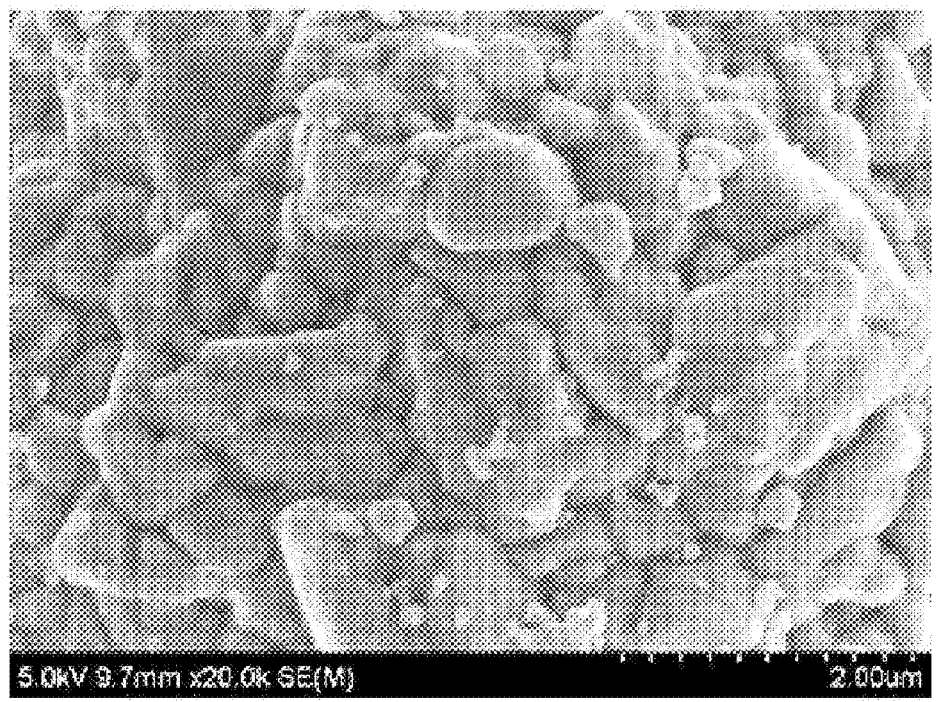
FIG. 4 is a scanning electron microscope image of a positive electrode active material prepared in Comparative Example 5.

Hereinafter, the present invention will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

A positive electrode active material according to the present invention includes a nickel-containing lithium transition metal oxide containing nickel in an amount of 65 mol % or more based on a total number of moles of transition metals excluding lithium; and a coating material formed on a surface of the nickel-containing lithium transition metal oxide, wherein the coating material includes boron (B) and cobalt (Co), and 1,000 ppm to 5,000 ppm of the Co is included in the coating material.

Specifically, the positive electrode active material may include the nickel-containing lithium transition metal oxide containing nickel in an amount of 65 mol % or more based on the total number of moles of transition metals excluding lithium, and may more preferably include a nickel-containing lithium transition metal oxide represented by Formula 1 below.

[Formula 1]

In Formula 1, 0≤x≤0.3, 0.65≤a≤0.9, 0.05≤b≤0.2, and 0.7≤a+b<1, preferably, 0≤x≤0.3, 0.65≤a≤0.8, 0.1≤b≤0.2, and 0.75≤a+b≤0.95, and Me is at least one selected from the group consisting of manganese (Mn) and aluminum (Al).

The nickel-containing lithium transition metal oxide may more preferably be $LiNi_aCo_bAl_{1-(a+b)}O_2$ or $LiNi_aCo_bMn_{1-(a+b)}O_2$, and may most preferably be at least one selected from the group consisting of $LiNi_{0.65}Co_{0.2}Al_{0.15}O_2$, $LiNi_{0.7}Co_{0.15}Al_{0.15}O_2$, $LiNi_{0.8}Co_{0.1}Al_{0.1}O_2$, $LiNi_{0.9}Co_{0.05}Al_{0.05}O_2$, $LiNi_{0.65}Co_{0.2}Mn_{0.15}O_2$, $LiNi_{0.7}Co_{0.15}Mn_{0.15}O_2$, $LiNi_{0.8}Co_{0.1}Mn_{0.1}O_2$, and $LiNi_{0.9}Co_{0.05}Mn_{0.05}O_2$. As described above, high capacity of a battery may be achieved when the battery is prepared by using the nickel-containing lithium transition metal oxide in which the amount of nickel is 65 mol % or more based on the total number of moles of transition metals excluding lithium.

The positive electrode active material includes a coating material including coating elements B and Co which is formed on the surface of the positive electrode active material. Since a contact between the positive electrode active material and an electrolyte solution included in the lithium secondary battery is blocked by the coating material, the occurrence of a side reaction is suppressed, and thus, life characteristics may be improved when used in the battery and, in addition, packing density of the positive electrode active material may be increased. Particularly, in a case in which the B is included as the coating element, since excellent electrical conductivity may be secured, initial resistance and resistance increase rate may be reduced and an effect of reducing lithium impurities remaining on the surface of a positive electrode material may be achieved, and, in a case in which the coating element Co is included, rate capability may be improved, and the initial resistance and resistance increase rate may be reduced because excellent electrical conductivity may be secured.

The coating material may include the B in an amount of 100 ppm to 500 ppm, for example, 200 ppm to 300 ppm and include the Co in an amount of 1,000 ppm to 5,000 ppm, for example, 2,000 ppm to 4,500 ppm. In a case in which the B and the Co are included in the coating material in amounts within the above ranges, an effect of suppressing a side reaction and corrosion of the surface of the positive electrode active material caused by hydrogen fluoride may more effectively occur, the rate capability and life characteristics may be further improved when used in the battery.

The amount of the Co included in the coating material may be measured using a transmission electron microscope and X-ray spectroscopy. For example, the amount of the Co present in the coating material may be measured using electron dispersive X-ray spectroscopy (EDS) of a JEM-2010F model (transmission electron microscope (TEM)) by JEOL Ltd.

The amount of the B included in the coating material, for example, may be measured using inductively coupled plasma (ICP) mass spectrometry. For example, ICP mass spectrometry may be performed using Optima 7000 dv (PerkinElmer, Inc.) in such a manner that a sample is divided such that 0.05 g of the sample is taken in a glass bottle (vial), its weight is measured, 2 mL of hydrochloric acid and 0.5 mL of hydrogen peroxide are added thereto and heated at 130° C. for 3 hours to dissolve the sample. Subsequently, 0.2 mL of internal STD is added to the dissolved sample, and the measurement may be made by diluting the solution to a volume of 20 mL with an ultrapure water solution.

The coating material may be uniformly distributed across an entire surface of the positive electrode active material and may be distributed in the form of partially coalesced islands. Specifically, in a case in which the coating material uniformly forms a coating layer across the entire surface of the positive electrode active material, the coating layer, for example, may have a thickness of 1 nm to 50 nm, preferably, 7 nm to 25 nm. In a case in which the coating material is distributed in the form of islands on the surface of the positive electrode active material, the coating material may be distributed such that it occupies an area of 20% or more to 90% or less of a total surface area of the positive electrode active material. In a case in which the area of the coating material is less than 20% of the total surface area of the positive electrode active material, an effect of improving structural stability due to the formation of the coating material may be insignificant. In a case in which the coating material is uniformly formed over the entire surface of the positive electrode active material, the structural stability of the surface of the positive electrode active material may be further improved.

A method of preparing a positive electrode active material according to the present invention includes: mixing a lithium raw material and a nickel-containing transition metal hydroxide precursor containing nickel in an amount of mol % or more based on a total number of moles of transition metals and performing a first heat treatment to prepare a nickel-containing lithium transition metal oxide; mixing a boron (B) and carbon (C)-containing raw material and a cobalt (Co)-containing raw material with the nickel-containing lithium transition metal oxide to form a mixture; and performing a second heat treatment on the mixture to form a coating material including B and Co on a surface of the lithium transition metal oxide.

Hereinafter, the method of preparing a positive electrode active material of the present invention will be described in detail.

First, a nickel-containing transition metal hydroxide precursor and a lithium raw material are mixed and subjected to a first heat treatment to prepare a nickel-containing lithium transition metal oxide.

The nickel-containing transition metal hydroxide precursor may contain nickel in an amount of 65 mol % or more based on a total number of moles of transition metals, and may be $Ni_{a1}Co_{b1}Me_{1-(a1+b1)}(OH)_2$ (where $0.65 \leq a1 \leq 0.8$, $0.05 \leq b1 \leq 0.2$, $0.85 \leq a1+b1 \leq 0.95$, and Me is at least one selected from the group consisting of Mn and Al). Preferably, the nickel-containing transition metal hydroxide precursor may be at least one selected from the group consisting of $Ni_{0.65}Co_{0.2}Al_{0.15}(OH)_2$, $Ni_{0.7}Co_{0.15}Al_{0.15}(OH)_2$, $Ni_{0.8}Co_{0.1}Al_{0.1}(OH)_2$, $Ni_{0.9}Co_{0.05}Al_{0.05}(OH)_2$, $Ni_{0.65}Co_{0.2}Mn_{0.15}(OH)_2$, $Ni_{0.7}Co_{0.15}Mn_{0.15}(OH)_2$, $Ni_{0.8}Co_{0.1}Mn_{0.1}(OH)_2$, and $Ni_{0.9}Co_{0.05}Mn_{0.05}(OH)_2$. In a case in which the amount of the nickel is 65 mol % or more based on a total number of moles of the precursor for a positive electrode active material as described above, high capacity of a battery may be achieved when the battery is prepared by using the precursor.

Also, the lithium raw material is not particularly limited as long as it is a compound including a lithium source, but, preferably, at least one selected from the group consisting of lithium carbonate ($Li_2CO_3$), lithium hydroxide (LiOH), $LiNO_3$, $CH_3COOLi$, and $Li_2(COO)_2$ may be used.

Furthermore, the nickel-containing transition metal hydroxide precursor and the lithium raw material may be mixed such that a molar ratio (Li/metal ratio) of lithium (Li) to metal is 1 to 1.3, preferably 1.05 to 1.1, and more preferably 1.07 to 1.09. In a case in which the nickel-containing transition metal hydroxide precursor and the lithium raw material are mixed within the above molar ratio range, a positive electrode active material exhibiting excellent capacity characteristics may be prepared.

The nickel-containing transition metal hydroxide precursor and the lithium raw material are subjected to a first heat treatment to prepare a positive electrode active material including a nickel-containing lithium transition metal oxide. The first heat treatment may be performed in a temperature range of 700° C. to 900° C.

In this case, the first heat treatment may be performed in an oxidizing atmosphere. In a case in which the first heat treatment is performed in an oxidizing atmosphere, it is possible to obtain residual lithium impurities to such an extent that the coating material may be sufficiently formed, and a nickel-containing transition metal oxide may be obtained in which development of grains is excellent. For example, in a case in which the first heat treatment is performed in an inert atmosphere such as a nitrogen atmosphere, since the amount of the residual lithium impurities is increased, metal oxide is not synthesized, and thus, the formation of the coating material may be difficult.

The first heat treatment may be performed in a first step at 600° C. to 800° C. for 4 hours to 5 hours in an oxidizing atmosphere and may then be performed in a second step at 800° C. to 900° C. for 8 hours to 10 hours. In a case in which the first heat treatment is performed in two steps, particle strength of the positive electrode active material may be improved. Also, the temperature and time of the first heat treatment satisfy the above ranges, since the raw materials do not remain in the particle, high-temperature stability of the battery may be improved, and, accordingly, bulk density and crystallinity may be improved. As a result, the structural stability of the positive electrode active material may be improved.

Subsequently, a mixture is formed by mixing a B and C-containing raw material and a Co-containing raw material with the nickel-containing lithium transition metal oxide.

Specifically, the B and C-containing raw material may be at least one selected from the group consisting of $B_4C$, $(C_3H_7O)_3B$, $(C_6H_5O)_3B$, $[CH_3(CH_2)_3O]_3B$, and $C_6H_5B(OH)_2$, and may be preferably $B_4C$.

For example, in a case in which the B and C-containing raw material is $B_4C$, since the $B_4C$ has a high melting point, it is favorable to be used as a raw material when a high-temperature heat treatment is performed. Also, the C included in the B and C-containing raw material may be easily oxidized due to its powerful reducing action and may easily suppress the oxidation of the coating raw material at the same time.

The B and C-containing raw material may be mixed in an amount of 0.02 part by weight to 0.04 part by weight based on 100 parts by weight of the nickel-containing lithium transition metal oxide. Since the B and C-containing raw material is mixed in an amount within the above range, the initial resistance and resistance increase rate may be reduced because excellent electrical conductivity is secured, and the effect of reducing the lithium impurities remaining on the surface of the positive electrode material may be achieved.

The Co-containing raw material may be used without limitation as long as it may coat surfaces of lithium transition metal oxide particles and does not degrade electrochemical performance, and may specifically be at least one selected from the group consisting of $Co(OH)_2$, $Co_2O_3$, $Co_3(PO_4)_2$, $CoF_3$, $CoOOH$, $Co(OCOCH_3)_2.4H_2O$, $Co(NO_3)_2.6H_2O$, $Co_3O_4$, $Co(SO_4).7H_2O$, and $CoC_2O_4$.

For example, in a case in which $Co(OH)_2$ is used as the Co-containing raw material, the structural stability may be further improved when it is used in the battery. However, there is a limitation in that, when the $Co(OH)_2$ is heat-treated at 300° C. or more in an oxidizing atmosphere, the $Co(OH)_2$ is oxidized into $Co_3O_4$ to act as resistance during an electrochemical reaction, or resistance characteristics are poor due to detachment of the $Co_3O_4$ from the surface of the positive electrode material by external physical influence during the preparation of the electrode or charge and discharge cycles. However, in a case in which the B and C-containing raw material as well as the Co-containing raw material is included as the coating material as in the present invention, the B and C-containing raw material may act as a reducing agent by carbon generated during a dissociation process during a high-temperature heat treatment. Accordingly, since it prevent the oxidation of the $Co(OH)_2$ into a metal oxide, Co may preferably remain in an amount of about 1,000 ppm to about 5,000 ppm in the coating material.

The Co-containing raw material may be mixed in an amount of 0.5 part by weight to 1.0 part by weight based on 100 parts by weight of the nickel-containing lithium transition metal oxide. Since the Co-containing raw material is mixed in an amount within the above range, rate capability may be improved.

Next, a second heat treatment is performed on the mixture at 500° C. to 750° C. to form a coating material including B and Co on the surface of the lithium transition metal oxide.

The second heat treatment may be performed at 500° C. to 750° C. for 3 hours to 8 hours, for example, 500° C. to 650° C. for 4 hours to 6 hours. In a case in which the temperature of the second heat treatment satisfies the above range, since the coating material is formed at a high temperature, surface modification of the positive electrode active material due to the formation of the coating material may easily occur without changes in the surface of the positive electrode active material, and thus, a positive electrode active material having high capacity and excellent structural stability even at a high voltage of 4.3 V or more may be prepared. For example, in a case in which the time and the temperature of the second heat treatment are outside the above ranges, capacity and life characteristics may be degraded due to the excessive formation of a lithium borate compound.

Also, provided is a positive electrode for a lithium secondary battery including the positive electrode active material according to the present invention. Specifically, provided is the positive electrode for a lithium secondary battery which includes a positive electrode collector and a positive electrode active material layer formed on the positive electrode collector, wherein the positive electrode active material layer includes the positive electrode active material according to the present invention.

In this case, since the positive electrode active material is the same as described above, detailed descriptions thereof will be omitted, and the remaining configurations will be only described in detail below.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

The positive electrode active material layer may selectively include a binder as well as a conductive agent, if necessary, in addition to the above-described positive electrode active material.

In this case, the positive electrode active material may be included in an amount of 80 wt % to 99 wt %, for example, 85 wt % to 98.5 wt % based on a total weight of the positive electrode active material layer. When the positive electrode active material is included in an amount within the above range, excellent capacity characteristics may be obtained.

The conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 0.1 wt % to 15 wt % based on the total weight of the positive electrode active material layer.

The binder improves the adhesion between the positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 0.1 wt % to 15 wt % based on the total weight of the positive electrode active material layer.

The positive electrode may be prepared according to a typical method of preparing a positive electrode except that the above-described positive electrode active material is used. Specifically, a composition for forming a positive electrode active material layer, which is prepared by dissolving or dispersing the positive electrode active material as well as selectively the binder and the conductive agent in a solvent, is coated on the positive electrode collector, and the positive electrode may then be prepared by drying and rolling the coated positive electrode collector.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material, the conductive agent, and the binder in consideration of a coating thickness of a slurry and manufacturing yield, and may allow to have a viscosity that may provide excellent thickness uniformity during the subsequent coating for the preparation of the positive electrode.

Also, as another method, the positive electrode may be prepared by casting the composition for forming a positive electrode active material layer on a separate support and then laminating a film separated from the support on the positive electrode collector.

Furthermore, in the present invention, an electrochemical device including the positive electrode may be prepared. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein, since the positive electrode is the same as described above, detailed descriptions thereof will be omitted, and the remaining configurations will be only described in detail below.

Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\beta(0<\beta<2)$, $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

The negative electrode active material may be included in an amount of 80 wt % to 99 wt % based on a total weight of the negative electrode active material layer.

The binder is a component that assists in the binding between the conductive agent, the active material, and the current collector, wherein the binder is typically added in an amount of 0.1 wt % to 10 wt % based on the total weight of the negative electrode active material layer. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated-EPDM, a styrene-butadiene rubber, a fluoro rubber, and various copolymers thereof.

The conductive agent is a component for further improving conductivity of the negative electrode active material, wherein the conductive agent may be added in an amount of 10 wt % or less, for example, 5 wt % or less based on the total weight of the negative electrode active material layer. The conductive agent is not particularly limited as long as it has conductivity without causing adverse chemical changes in the battery, and, for example, a conductive material such as: graphite such as natural graphite or artificial graphite; carbon black such as acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used.

For example, the negative electrode active material layer may be prepared by coating a composition for forming a negative electrode, which is prepared by dissolving or dispersing selectively the binder and the conductive agent as well as the negative electrode active material in a solvent, on the negative electrode collector and drying the coated negative electrode collector, or may be prepared by casting the composition for forming a negative electrode on a separate support and then laminating a film separated from the support on the negative electrode collector.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve life characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphorictriamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present invention stably exhibits excellent discharge capacity, output characteristics, and life characteristics, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

A $Ni_{0.65}Co_{0.2}Mn_{0.15}(OH)_2$ precursor and $Li_2CO_3$ were mixed such that a molar ratio of transition metal to Li was 1.0:1.07, and a mixture was put in an alumina crucible, heat-treated at 750° C. for 5 hours in an oxygen atmosphere, and then heat-treated at 870° C. for 10 hours to prepare a positive electrode active material.

The prepared positive electrode active material was ground using a mortar. $B_4C$ and $Co(OH)_2$, as a coating element-containing raw material, were respectively added to the ground positive electrode active material in amounts of 0.02 part by weight and 0.8 part by weight based on 100 parts by weight of the positive electrode active material and mixed. Subsequently, a heat treatment was performed at 600° C. for 5 hours in an air atmosphere. After grinding the heat-treated powder using a mortar, powder thus obtained was classified using a 325 mesh sieve to prepare a positive electrode active material having a surface on which a coating material including B and Co was distributed in the form of islands.

Example 2

A positive electrode active material was prepared in the same manner as in Example 1 except that $B_4C$ and $Co(OH)_2$, as a coating element-containing raw material, were respectively mixed in amounts of 0.02 part by weight and 0.4 part by weight based on 100 parts by weight of the ground positive electrode active material.

Comparative Example 1

A positive electrode active material was prepared in the same manner as in Example 1 except that $H_3BO_3$ was included as a coating element-containing raw material in an amount 0.05 part by weight based on 100 parts by weight of the positive electrode active material and a heat treatment was performed at 380° C. for 8 hours.

Comparative Example 2

A positive electrode active material was prepared in the same manner as in Example 1 except that $Co(OH)_2$ was included as a coating element-containing raw material in an amount 0.5 part by weight based on 100 parts by weight of the positive electrode active material and a heat treatment was performed at 600° C. for 5 hours.

Comparative Example 3

A positive electrode active material was prepared in the same manner as in Example 1 except that $B_4C$ was included as a coating element-containing raw material in an amount 0.05 part by weight based on 100 parts by weight of the positive electrode active material and a heat treatment was performed at 600° C. for 5 hours.

Comparative Example 4

A positive electrode active material was prepared in the same manner as in Example 1 except that $H_3BO_3$ and $WO_3$, as a coating element-containing raw material, were respectively included in amounts of 0.02 part by weight and 0.6 part by weight based on 100 parts by weight of the positive electrode active material and a heat treatment was performed at 380° C. for 8 hours.

Comparative Example 5

A positive electrode active material was prepared in the same manner as in Example 1 except that $B_2O_3$ and $Li_2CO_3$, as a coating element-containing raw material, were respectively included in amounts of 0.163 part by weight and 0.161 part by weight based on 100 parts by weight of the positive electrode active material and a heat treatment was performed at 600° C. for 5 hours.

Experimental Example 1

Surface characteristics of each of the positive electrode active materials prepared in Example 1 and Comparative Examples 1, 2, and 5 were confirmed using a scanning electron microscope, and the surface characteristics are presented in FIGS. 1 to 4. With respect to the positive electrode active material of Comparative Example 2 which was only coated with Co (see FIG. 3), more small grains (Co particles) were distributed on the surface of the active material in comparison to the positive electrode active material (See FIG. 1) of Example 1. In a case in which the Co particles were distributed like grains on the surface as in Comparative Example 2, detachment of the Co particles distributed like grains on the surface may occur during a mixing process, for example, a mixing process in a batch-type reactor or a mixing process using ultrasonic waves during the preparation of the electrode, and, in this case, an improvement in charge and discharge characteristics and an effect of improving resistance characteristics may not be achieved.

In contrast, with respect to the positive electrode active material prepared in Example 1, it may be confirmed that a relatively smooth surface was formed as in Comparative Example 1 (see FIG. 2) in which the coating material was formed at a relatively low temperature. Also, with respect to the positive electrode active material prepared in Comparative Example 5, its surface appeared relatively smooth as in Example 1 and Comparative Example 1, but this was due to the fact that the amount of Co was smaller than those of Example 1 and Comparative Examples 1 and 2.

Experimental Example 2: Evaluation of Electrochemical Properties of Positive Electrode Active Material Lithium secondary batteries were prepared by using the positive electrode active materials respectively prepared in Examples 1 and 2 and Comparative Examples 1 and 3 to 5, and capacity characteristics were confirmed using the lithium secondary batteries.

First, in order to prepare the lithium secondary batteries according to Examples 1 and 2 and Comparative Examples 1 and 3 to 5, each of the positive electrode active materials prepared in Examples 1 and 2 and Comparative Examples 1 and 3 to 5, a carbon black conductive agent, and a polyvinylidene fluoride (PVDF) binder were mixed in a weight ratio of 95:2.5:2.5, and a mixture was mixed in an N-methylpyrrolidone solvent to prepare a composition for forming a positive electrode. A 20 μm thick Al foil was coated with the composition for forming a positive electrode, dried, and then roll-pressed to prepare a positive electrode. A lithium metal electrode having a diameter of 16 mm was used as a negative electrode. After the above-prepared positive electrode and negative electrode were stacked with a polypropylene separator to prepare an electrode assembly, the electrode assembly was put in a battery case, an electrolyte solution, in which 1 M $LiPF_6$ was dissolved in a mixed solvent in which ethyl methyl carbonate and ethylene carbonate were mixed in a ratio of 7:3, was injected thereinto to prepare the lithium secondary batteries of Examples 1 and 2 and Comparative Examples 1 and 3 to 5.

After each of the above-prepared lithium secondary batteries of Examples 1 and 2 and Comparative Examples 1 and 3 to 5 was charged at a constant current of 0.1 C to 4.3 V at 25° C. and discharged at a constant current of 0.1 C to a voltage of 3 V, charge and discharge characteristics in the first cycle were then observed, and the results thereof are presented in the following Table 1 and FIG. 5. Thereafter, using different discharge conditions of 1.0 C and 2.0 C, discharge capacities at 1.0 C and 2.0 C were measured and respectively presented in FIG. 6 and FIG. 7, and efficiencies at 1.0 C and 2.0 C, which were calculated by dividing the discharge capacities by initial charge capacity, are presented in Table 2 below.

TABLE 1

|  | Charge capacity (mAh/g) | Discharge capacity (mAh/g) | Efficiency (%) |
| --- | --- | --- | --- |
| Example 1 | 204.65 | 186.08 | 90.9 |
| Example 2 | 203.82 | 184.52 | 90.5 |
| Comparative Example 1 | 204.46 | 180.44 | 88.3 |
| Comparative Example 3 | 203.21 | 182.10 | 89.6 |
| Comparative Example 4 | 203.62 | 182.49 | 89.6 |
| Comparative Example 5 | 203.41 | 182.29 | 89.6 |

Figure 5:
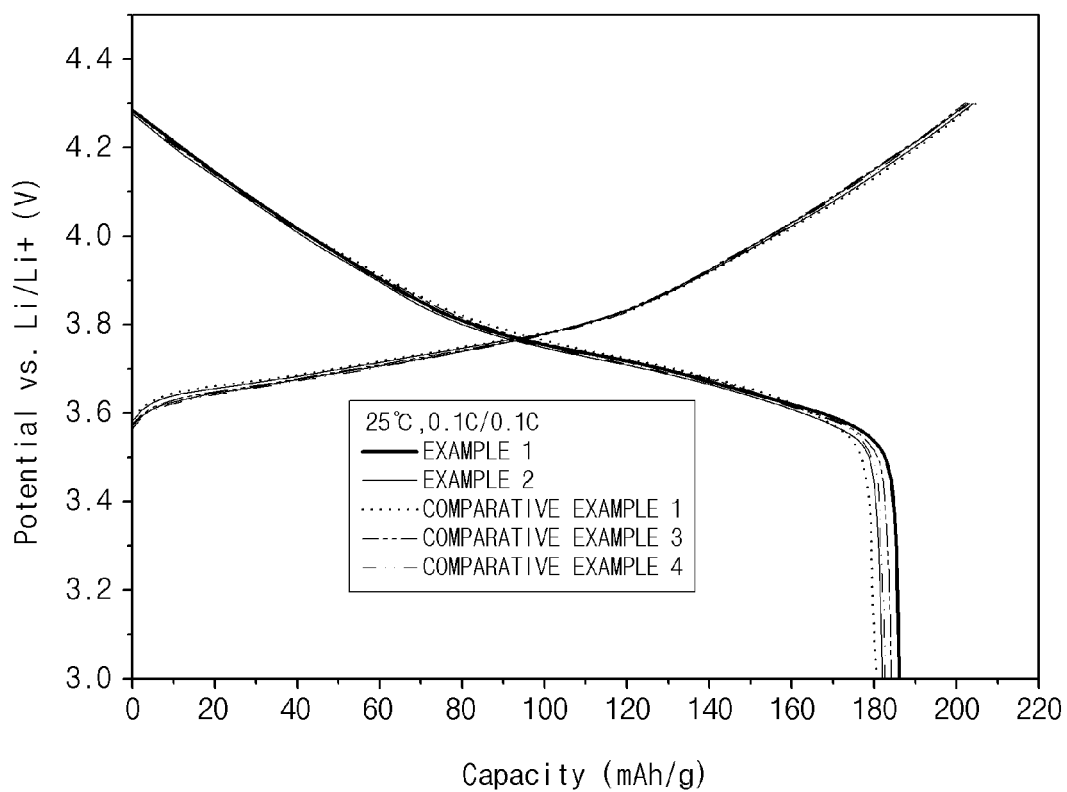
FIG. 5 is a graph illustrating charge and discharge characteristics of lithium secondary batteries prepared in Examples 1 and 2 and Comparative Examples 1, 3, and 4.

As illustrated in Table 1 and FIG. 5, with respect to the lithium secondary batteries prepared in Comparative Examples 1 and 3 to 5, it may be confirmed that efficiencies of less than 90% were obtained when charged at a 0.1 C-rate. In contrast, with respect to the lithium secondary batteries prepared in Examples 1 and 2, since efficiencies of 90% or more were obtained when charged and discharged at a 0.1 C-rate, it may be confirmed that the lithium secondary batteries according to the present invention exhibited better efficiencies.

TABLE 2

|  | 1.0 C | | 2.0 C | |
| --- | --- | --- | --- | --- |
|  | Discharge capacity (mAh/g) | Efficiency (%) | Discharge capacity (mAh/g) | Efficiency (%) |
| Example 1 | 171.85 | 92 | 165.77 | 89 |
| Example 2 | 168.89 | 91.5 | 164.25 | 89 |
| Comparative Example 1 | 162.63 | 90 | 155.79 | 86 |
| Comparative Example 3 | 166.10 | 91 | 159.19 | 87 |
| Comparative Example 4 | 164.15 | 90 | 156.97 | 86 |
| Comparative Example 5 | 167.54 | 90 | 163.52 | 86 |

Figure 6:
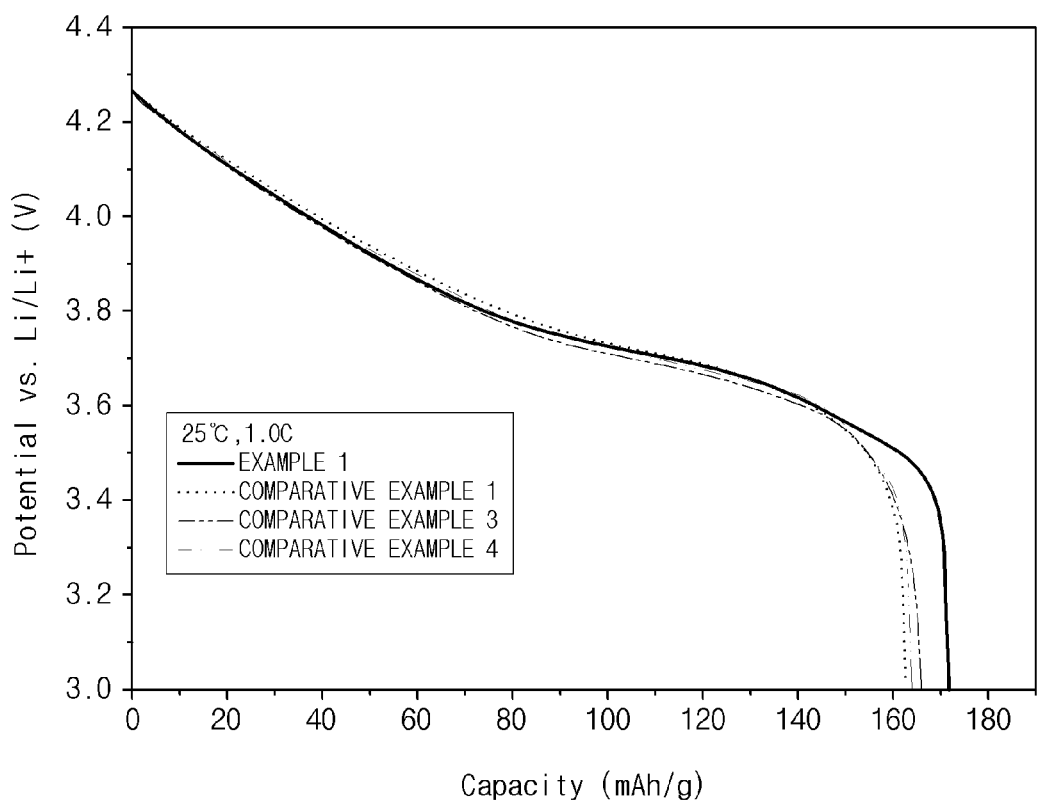
FIG. 6 is a graph illustrating discharge capacities when the lithium secondary batteries prepared in Example 1 and Comparative Examples 1, 3, and 4 were discharged at a constant current of 1.0 C.
Figure 7:
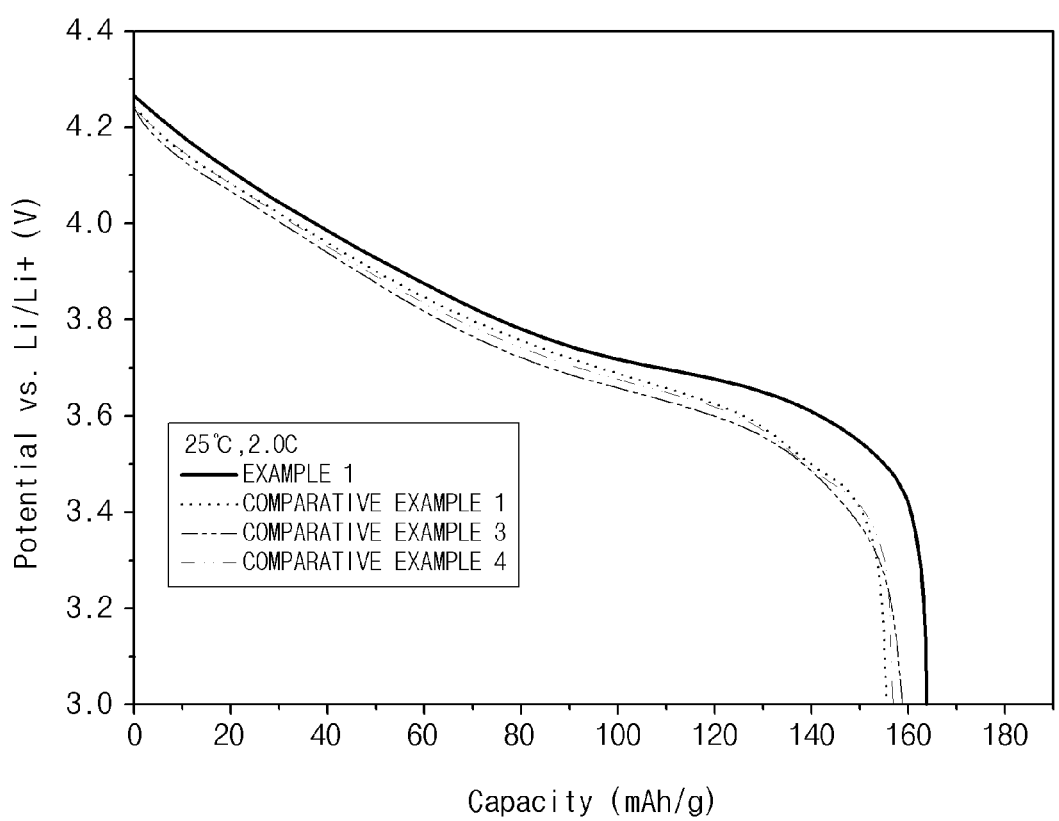
FIG. 7 is a graph illustrating discharge capacities when the lithium secondary batteries prepared in Example 1 and Comparative Examples 1, 3, and 4 were discharged at a constant current of 2.0 C.

Also, as illustrated in Table 2 and FIGS. 6 and 7, with respect to the secondary batteries prepared in Examples 1 and 2, it may be confirmed that the secondary batteries exhibited efficiencies of 90% or more at a 1.0 C-rate and exhibited excellent efficiencies of about 89% at a 2.0 C-rate, and discharge capacities were also most improved.

In contrast, referring to Comparative Examples 1 and 3 to 5, it may be confirmed that rate capabilities respectively at 1.0 C and 2.0 C were inferior to those of Example 1 which included B and Co in amounts within the ranges of the present invention.

Experimental Example 3: Resistance Characteristics of Lithium Secondary Battery

Resistance characteristics were evaluated for the lithium secondary batteries of Examples 1 and 2 and Comparative Examples 1 to 5 prepared in Experimental Example 2.

Specifically, the lithium secondary batteries of Examples 1 and 2 and Comparative Examples 1 to 5 were charged at a constant current of 0.5 C to 4.3 V at 25° C., were left standing for 20 minutes, and then discharged at a constant current of 1.0 C to a voltage of 3 V. The charging and discharging behaviors were set as one cycle, and, after this cycle was repeated 50 times, resistance increase rates according to the examples and comparative examples were measured, and the results thereof are presented in Table 3 below.

TABLE 3

|  | Initial resistance (Ω) | Resistance after 50 cycles (Ω) | Resistance increase rate (%) |
| --- | --- | --- | --- |
| Example 1 | 7.67 | 11.40 | 1.48 |
| Example 2 | 7.51 | 11.87 | 1.58 |
| Comparative Example 1 | 8.23 | 13.03 | 1.58 |
| Comparative Example 2 | 7.35 | 12.14 | 1.65 |
| Comparative Example 3 | 7.92 | 12.77 | 1.61 |
| Comparative Example 4 | 7.85 | 12.51 | 1.59 |
| Comparative Example 5 | 7.78 | 13.21 | 1.69 |

As illustrated in Table 3, with respect to the secondary battery prepared in Example 1, it may be confirmed that the secondary battery exhibited a resistance increase rate of less than 1.5% relative to initial resistance during the measurement of resistance after 50 cycles. With respect to the secondary battery prepared in Example 2, since structural stability of the positive electrode active material was relatively reduced due to a reduction in Co content in the coating material, it may be confirmed that resistance characteristics were inferior to those of Example 1 when the positive electrode active material was used in the battery.

Also, with respect to the secondary batteries prepared in Comparative Examples 1, 3, and 4, it may be confirmed that resistance increase rates were higher than that of Example 1. Accordingly, in a case in which the coating material including both B and C was formed, it may be confirmed that the resistance increase rate of the positive electrode active material including the same was reduced. With respect to the secondary battery prepared in Comparative Example 2, since only Co was included in the coating material, the cobalt was oxidized into cobalt oxide so that the cobalt oxide may be detached from the surface of the positive electrode active material or may gradually act as resistance as cycles proceeded, and thus, it may be confirmed that resistance characteristics were poor.

Furthermore, with respect to the secondary battery prepared in Comparative Example 5, capacity characteristics were improved due to the inclusion of both B and Co, but, since the carbon-containing B raw material of the present invention was not used as a B raw material, the B raw material did not act as a reducing agent even if the Co raw material was oxidized, and thus, it was confirmed that resistance was increased after 50 cycles because the Co raw material was oxidized to act as resistance.

That is, according to the present invention, in a case in which a coating material including B and Co is coated on the surface of a lithium transition metal oxide, since specific compounds are respectively used as the B and C-containing raw material and the Co-containing raw material, the B and C-containing raw material may act as a reducing agent during a heat treatment after the formation of the coating material including B and Co on the surface of the lithium transition metal oxide, and thus, the oxidation of the Co-containing raw material may be prevented. Accordingly, Co is not reduced even if a high-temperature heat treatment is performed, but remains in the coating material to achieve the effect according to the present invention.

The invention claimed is:

1. A method of preparing a positive electrode active material, comprising:
mixing a lithium raw material and a nickel-containing transition metal hydroxide precursor containing nickel in an amount of 65 mol % or more based on a total number of moles of transition metals and performing a first heat treatment to prepare a nickel-containing lithium transition metal oxide;
mixing a boron (B) and carbon (C)-containing raw material and a cobalt (Co)-containing raw material with the nickel-containing lithium transition metal oxide to form a mixture; and
performing a second heat treatment on the mixture to form a coating material including B and Co on a surface of the lithium transition metal oxide.

2. The method of claim 1, wherein the B and C-containing raw material comprises $B_4C$, $(C_3H_7O)_3B$, $(C_6H_5O)_3B$, $[CH_3(CH_2)_3O]_3B$, or $C_6H_5B(OH)_2$.

3. The method of claim 1, wherein the B and C-containing raw material is mixed in an amount of 0.02 part by weight to 0.04 part by weight based on 100 parts by weight of the nickel-containing lithium transition metal oxide.

4. The method of claim 1, wherein the Co-containing raw material comprises $Co(OH)_2$, $Co_2O_3$, $Co_3(PO_4)_2$, $CoF_3$, CoOOH, $Co(OCOCH_3)_2 \cdot 4H_2O$, $Co(NO_3)_2 \cdot 6H_2O$, $Co_3O_4$, $Co(SO_4) \cdot 7H_2O$, or $CoC_2O_4$.

5. The method of claim 1, wherein the Co-containing raw material is mixed in an amount of 0.5 part by weight to 1.0 part by weight based on 100 parts by weight of the nickel-containing lithium transition metal oxide.

6. The method of claim 1, wherein the first heat treatment is performed at 700° C. to 900° C.

7. The method of claim 1, wherein the first heat treatment comprises performing in a first step at 600° C. to 800° C. for 4 hours to 5 hours and then performing in a second step at 800° C. to 900° C. for 8 hours to 10 hours.

8. The method of claim 1, wherein the first heat treatment is performed in an oxidizing atmosphere.

9. The method of claim 1, wherein the second heat treatment is performed at 500° C. to 750° C.

10. A positive electrode active material comprising:
a nickel-containing lithium transition metal oxide containing nickel in an amount of 65 mol % or more based on a total number of moles of transition metals excluding lithium; and
a coating material distributed on a surface of the nickel-containing lithium transition metal oxide,
wherein the coating material comprises boron (B) and cobalt (Co), and
wherein the Co of the coating material is present in an amount of 1,000 ppm to 5,000 ppm based on the total weight of the positive electrode active material.

11. The positive electrode active material of claim 10, wherein the B of the coating material is present in an amount of 100 ppm to 500 ppm based on the total weight of the positive electrode active material.

12. The positive electrode active material of claim 10, wherein the nickel-containing lithium transition metal oxide is represented by Formula 1:

[Formula 1]

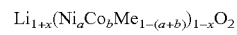

$$Li_{1+x}(Ni_a Co_b Me_{1-(a+b)})_{1-x}O_2$$

wherein,
$0 \leq x \leq 0.3$, $0.65 \leq a \leq 0.9$, $0.05 \leq b \leq 0.2$, $0.7 \leq a+b < 1$, and Me is at least one selected from the group consisting of manganese (Mn) and aluminum (Al).

13. A positive electrode for a lithium secondary battery, the positive electrode comprising the positive electrode active material of claim 10.

14. A lithium secondary battery comprising the positive electrode of claim 13.

* * * * *